US011952971B2

(12) United States Patent
Dudar

(10) Patent No.: US 11,952,971 B2
(45) Date of Patent: Apr. 9, 2024

(54) METHODS AND SYSTEM FOR EVALUATING AN ENGINE FOR HYDROLOCK

(71) Applicant: Ford Global Technologies, LLC, Dearborn, MI (US)

(72) Inventor: Aed Dudar, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 56 days.

(21) Appl. No.: 17/457,845

(22) Filed: Dec. 6, 2021

(65) Prior Publication Data
US 2023/0175467 A1 Jun. 8, 2023

(51) Int. Cl.
| | | |
|---|---|---|
| *F02N 11/08* | (2006.01) | |
| *B60W 10/06* | (2006.01) | |
| *B60W 10/08* | (2006.01) | |
| *B60W 20/15* | (2016.01) | |

(52) U.S. Cl.
CPC ......... *F02N 11/0807* (2013.01); *B60W 10/06* (2013.01); *B60W 10/08* (2013.01); *B60W 20/15* (2016.01)

(58) Field of Classification Search
CPC ... F02N 11/0807; B60W 20/15; B60W 10/06; B60W 10/08
See application file for complete search history.

(56) References Cited

U.S. PATENT DOCUMENTS

| | | | |
|---|---|---|---|
| 4,208,991 A * | 6/1980 | Reddy | F02D 41/064 |
| | | | 123/179.17 |
| 6,603,405 B2 | 8/2003 | Smith | |
| 8,960,347 B2 | 2/2015 | Bennett | |
| 9,238,458 B2 | 1/2016 | Okubo et al. | |
| 10,255,782 B1 * | 4/2019 | Ghannam | G08B 21/20 |
| 10,493,993 B2 | 12/2019 | Dudar et al. | |
| 10,894,544 B2 | 1/2021 | Anderson et al. | |
| 2020/0130622 A1 * | 4/2020 | Lerner | B60W 50/0098 |

FOREIGN PATENT DOCUMENTS

| | | | | |
|---|---|---|---|---|
| CN | 102852656 A * | 1/2013 | ............ | B60W 10/06 |
| EP | 903492 B1 * | 12/2009 | ............ | B60K 6/445 |
| JP | 3820842 B2 * | 9/2006 | ............ | B60K 6/485 |
| JP | 2008121572 A * | 5/2008 | | |
| KR | 100967374 B1 | 7/2010 | | |

(Continued)

OTHER PUBLICATIONS

Machine Translation of EP903492B1 PDF File Name: "EP0903492B1_Machine_Translation.pdf".*

(Continued)

*Primary Examiner* — Grant Moubry
*Assistant Examiner* — Ruben Picon-Feliciano
(74) *Attorney, Agent, or Firm* — Vincent Mastrogiacomo; McCoy Russell LLP

(57) ABSTRACT

Systems and methods for operating an engine that may be rotated by an electric machine during engine starting are described. In one example, an amount of electric current that is available to rotate the engine via the electric machine may be adjusted in response to an indication that a vehicle that includes the engine may be parked in a geographical area that may be flooded.

20 Claims, 7 Drawing Sheets

(56) References Cited

FOREIGN PATENT DOCUMENTS

WO      WO-2015093554 A1 * 6/2015 .............. F02N 11/04

OTHER PUBLICATIONS

Machine Translation of JP2008121572A PDF File Name: "JP2008121572A_Machine_Translation.pdf".*
Machine Translation of JP 3820842 B2 PDF File Name: "JP3820842B2_Machine_Translation.pdf".*
Machine Translation of CN102852656A PDF File Name: "CN102852656A_Machine_Translation.pdf".*
Machine Translation of WO2015093554A1 PDF File Name: "WO2015093554A1_Machine_Translation.pdf".*

* cited by examiner

METHODS AND SYSTEM FOR EVALUATING AN ENGINE FOR HYDROLOCK

FIELD

The present description relates to methods and a system for evaluating an engine for the presence or absence of water in engine cylinders.

BACKGROUND AND SUMMARY

A vehicle may be parked in an area that unexpectedly floods such that water may cover a portion of an engine air intake. If the engine is cranked and started while the engine air intake is partially covered with water, the engine may ingest water. The water may enter engine cylinders where the engine's pistons may attempt to compress the nearly incompressible water. As a result, it may be possible for an engine's pistons and/or rods to experience some level of degradation. Therefore, it may be desirable to provide a way limiting the possibility of engine degradation during such conditions.

The inventor herein has recognized the above-mentioned issues and has developed a method for operating an engine, comprising: adjusting an amount of electric current available to crank the engine via a controller in response to an indication of flooding in a geographical area.

By adjusting an amount of electric current that is available to crank an engine, it may be possible to rotate an engine without degrading engine components. For example, an engine may be cranked using a lower cranking torque via reducing electric current that is available to rotate and crank the engine so that a possibility of engine component degradation may be reduced if the engine inducts water. In addition, the possibility of engine component degradation may be reduced if water enters engine cylinders in ways other than during engine cranking. For example, the possibility of bent or cracked rods and/or degraded pistons may be reduced if a reduced amount of electric current is available to generate torque to rotate the engine via an electric machine. The reduced amount of torque may allow the engine to stop rotating before the rods and/or pistons may be degraded due to attempting to compress water. The water may be drained from the engine at a later time without having to replace the rods and/or pistons.

The present description may provide several advantages. In particular, the approach may reduce engine component degradation if an engine ingests water. Further, the approach may reduce engine servicing costs for an engine that ingests water or if water seeps into an engine. In addition, the engine may operate as may be expected if water is not ingested into the engine.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where.

DETAILED DESCRIPTION

Figure 2:
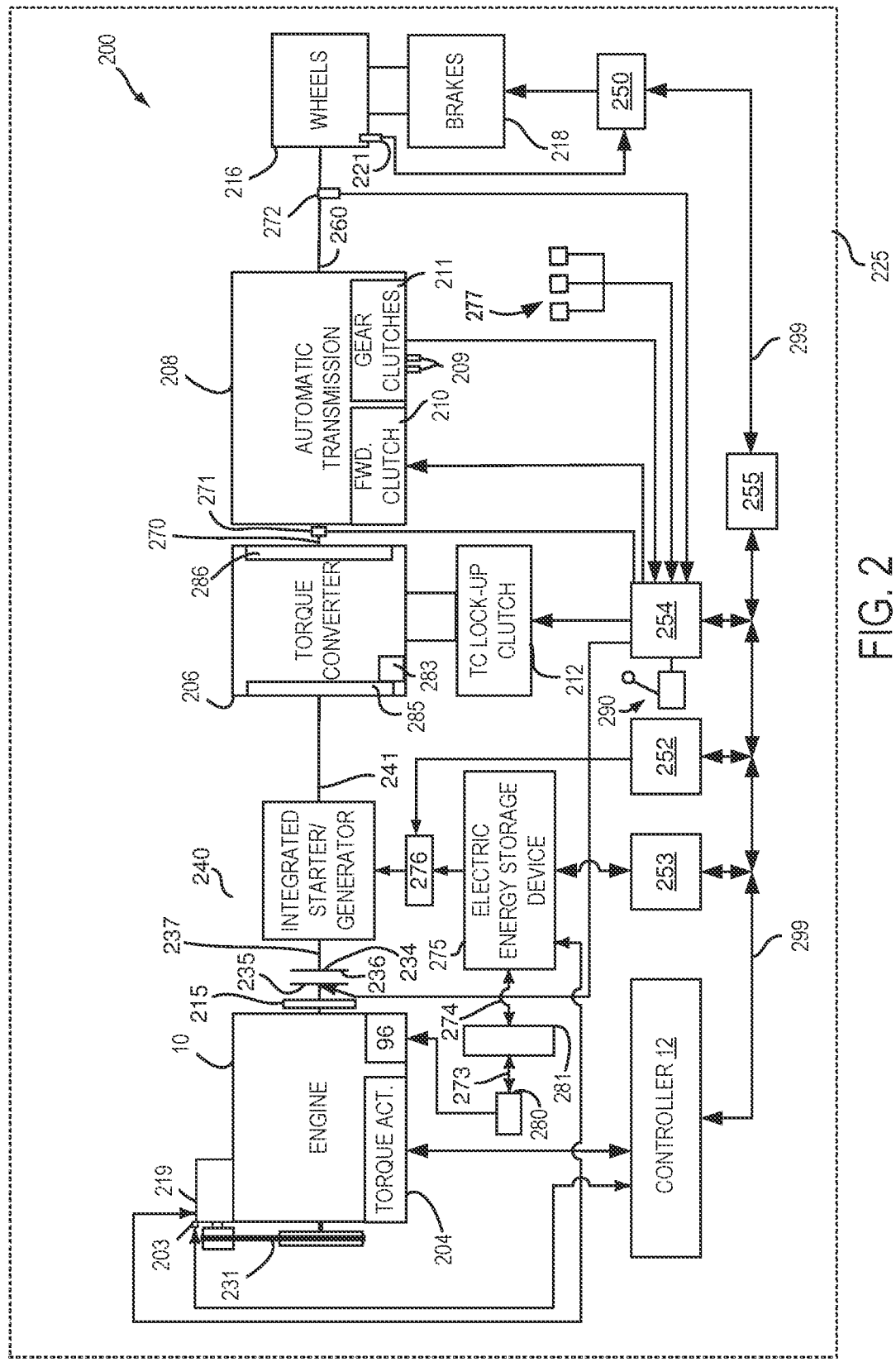
FIG. 2 is a schematic diagram of a hybrid vehicle driveline.
Figure 3:
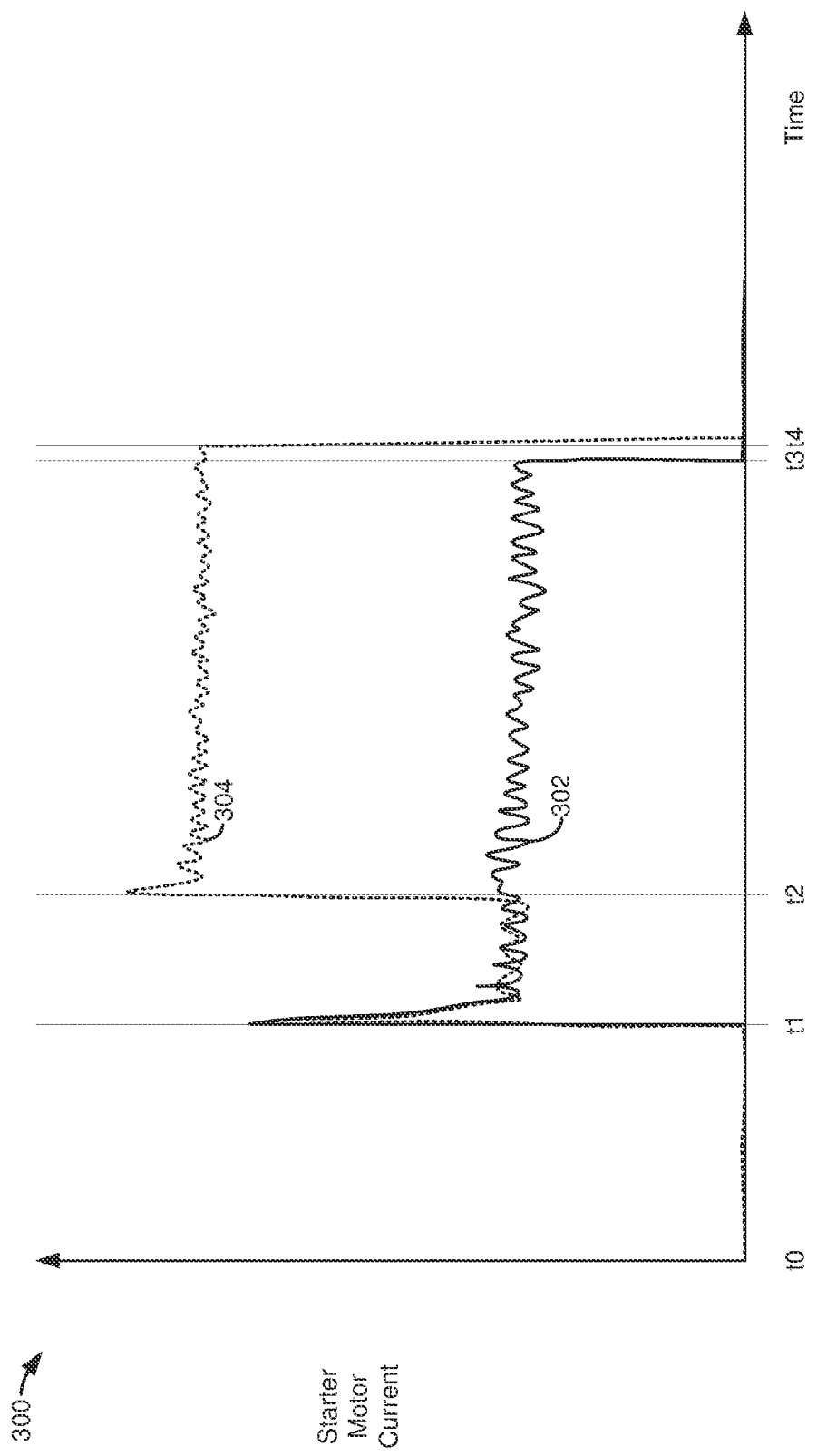
FIG. 3 shows example electric machine electric currents during engine cranking.
Figure 4:
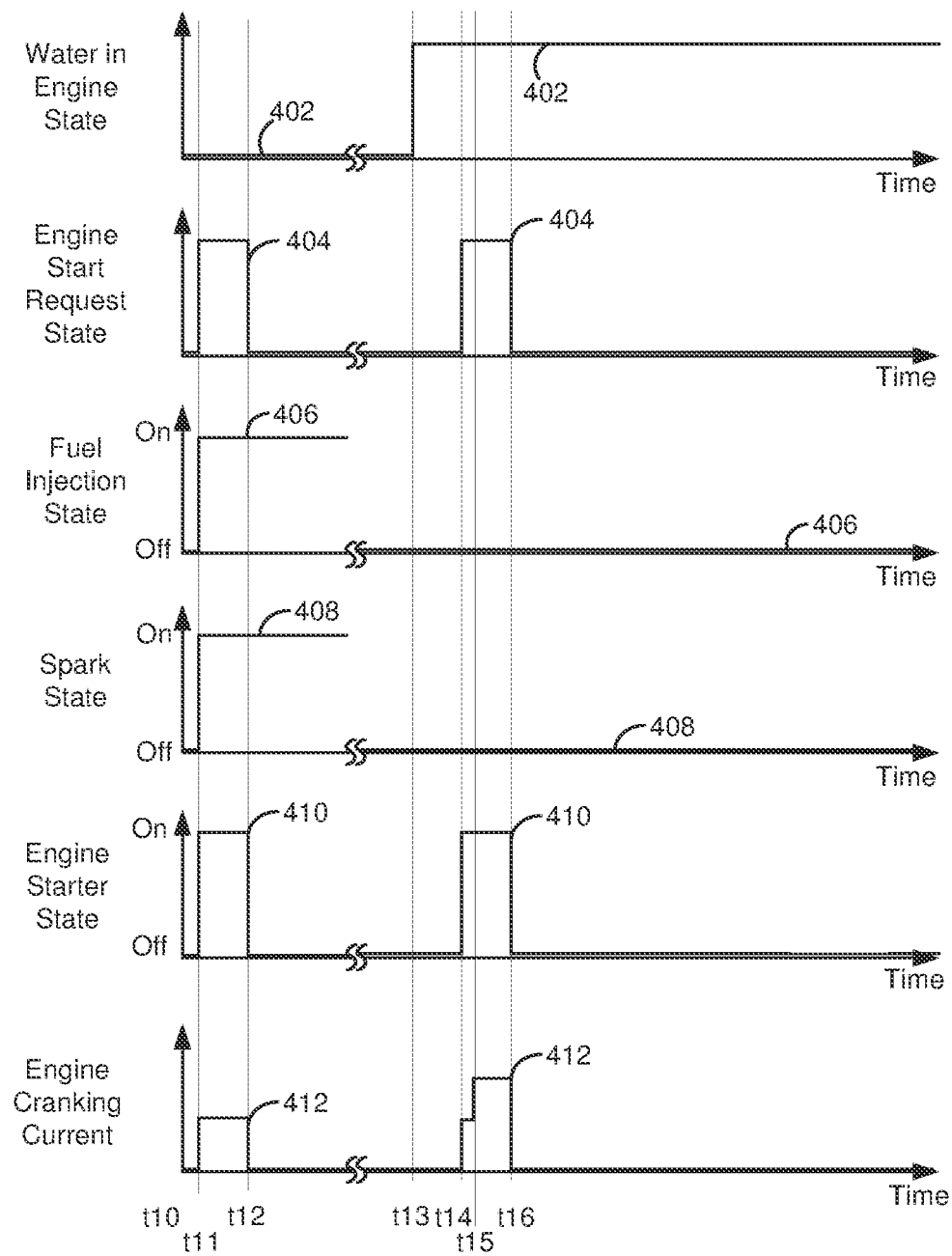
FIG. 4 is a plot of an example vehicle operating sequence according to the method of FIGS. 5 and 6.

The present description is related to operating an engine of a vehicle that may be exposed to water during the vehicle's life time. The water may be ingested into the engine or it may seep into the engine. For example, if the vehicle is parked next to a river that overflows its banks, water may enter the engine via cranking the engine and the engine ingesting water, or alternatively, water may seep into the engine. The engine may be of the type shown in FIG. 1. The engine may also be included in a hybrid driveline as shown in FIG. 2. The torque to crank the engine may vary depending of engine conditions as shown in FIG. 3. The engine may be operated as shown in the sequence of FIG. 4 according to the method of FIGS. 5 and 6. The engine and vehicle may be exposed to water in a geographical area as shown in FIGS. 7A and 7B.

Figure 1:
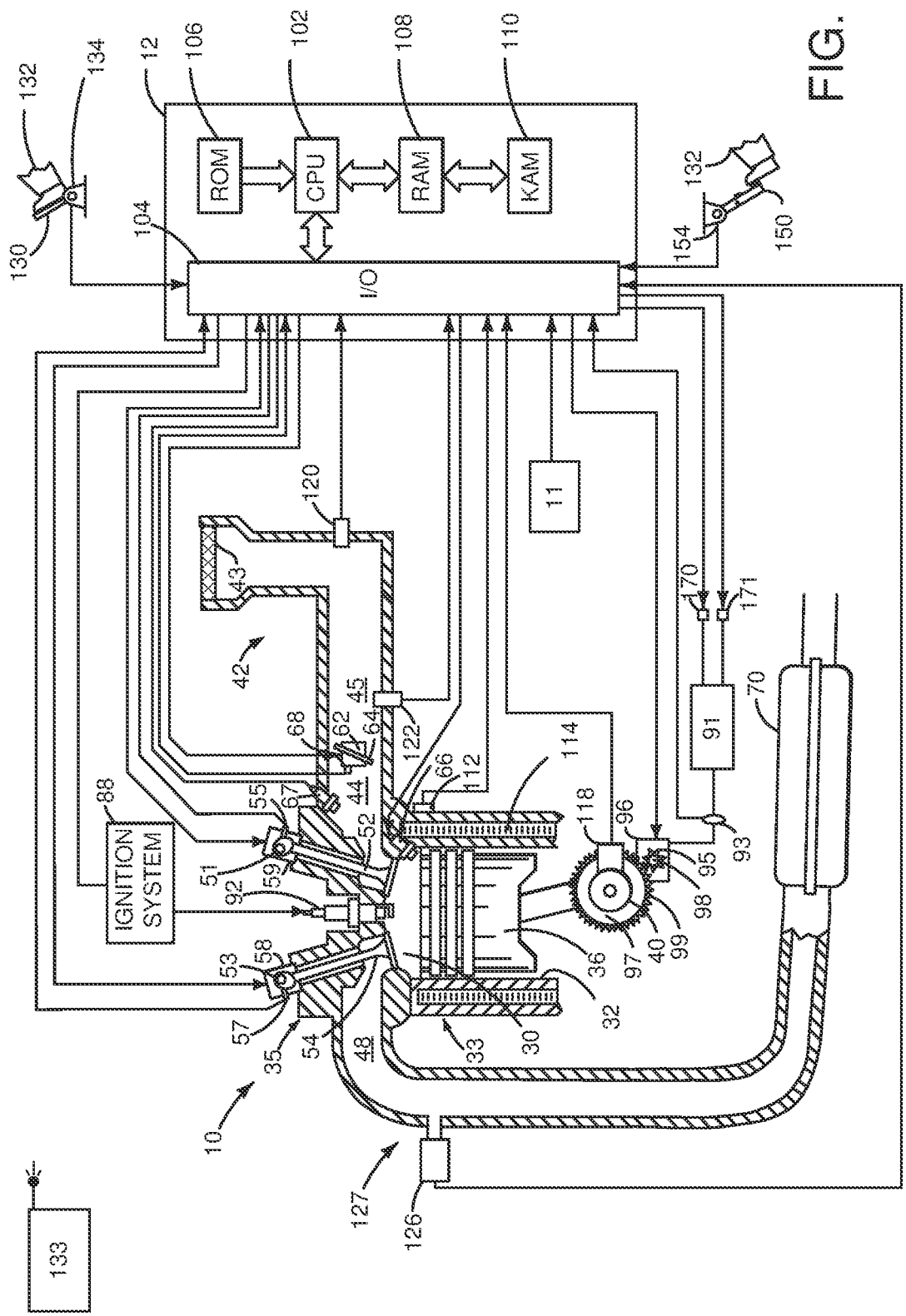
FIG. 1 is a schematic diagram of an engine.

Referring to FIG. 1, internal combustion engine 10, comprising a plurality of cylinders, one cylinder of which is shown in FIG. 1, is controlled by electronic engine controller 12. The controller 12 receives signals from the various sensors shown in FIGS. 1 and 2. The controller 12 employs the actuators shown in FIGS. 1 and 2 to adjust engine and driveline operation based on the received signals and instructions stored in memory of controller 12.

Engine 10 is comprised of cylinder head 35 and block 33, which include combustion chamber 30 and cylinder walls 32. Piston 36 is positioned therein and reciprocates via a connection to crankshaft 40. Flywheel 97 and ring gear 99 are coupled to crankshaft 40. Optional starter 96 (e.g., low voltage (operated with less than 30 volts) electric machine) includes pinion shaft 98 and pinion gear 95. Pinion shaft 98 may selectively advance pinion gear 95 to engage ring gear 99. Starter 96 may be directly mounted to the front of the engine or the rear of the engine. In some examples, starter 96 may selectively supply power to crankshaft 40 via a belt or chain. In one example, starter 96 is in a base state when not engaged to the engine crankshaft. Starter 96 may be supplied with electrical power via electric energy storage device 91 (e.g., a battery). Electric current supplied to starter 96 may be determined by controller 12 via current sensor 93.

Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57. Intake valve 52 may be selectively activated and deactivated by valve activation device 59. Exhaust valve 54 may be selectively activated and deactivated by valve activation device 58. Valve activation devices 58 and 59 may be electro-mechanical devices.

Direct fuel injector 66 is shown positioned to inject fuel directly into cylinder 30, which is known to those skilled in the art as direct injection. Port fuel injector 67 is shown positioned to inject fuel into the intake port of cylinder 30, which is known to those skilled in the art as port injection. Fuel injectors 66 and 67 deliver liquid fuel in proportion to pulse widths provided by controller 12. Fuel is delivered to fuel injectors 66 and 67 by a fuel system (not shown) including a fuel tank, fuel pump, and fuel rail (not shown).

In addition, intake manifold 44 is shown communicating with turbocharger compressor 162 and engine air intake 42. In other examples, compressor 162 may be a supercharger compressor. Shaft 161 mechanically couples turbocharger turbine 164 to turbocharger compressor 162. Optional electronic throttle 62 adjusts a position of throttle plate 64 to control air flow from compressor 162 to intake manifold 44. Pressure in boost chamber 45 may be referred to a throttle inlet pressure since the inlet of throttle 62 is within boost chamber 45. The throttle outlet is in intake manifold 44. In some examples, throttle 62 and throttle plate 64 may be positioned between intake valve 52 and intake manifold 44 such that throttle 62 is a port throttle. Compressor recirculation valve 47 may be selectively adjusted to a plurality of positions between fully open and fully closed. Waste gate 163 may be adjusted via controller 12 to allow exhaust gases to selectively bypass turbine 164 to control the speed of compressor 162. Air filter 43 cleans air entering engine air intake 42.

Distributorless ignition system 88 provides an ignition spark to combustion chamber 30 via spark plug 92 in response to controller 12. Combustion gases may exit engine 10 and enter exhaust system 127. Exhaust system 127 includes an exhaust manifold, a universal exhaust gas oxygen (UEGO) sensor 126, and a three-way catalyst 70. The exhaust sensor 126 is located upstream of three-way catalyst 70 according to a direction of exhaust gas flow. In some examples, a two-state exhaust gas oxygen sensor may be substituted for UEGO sensor 126. Three-way catalyst 70 may include multiple bricks.

Controller 12 is shown in FIG. 1 as a conventional microcomputer including: microprocessor unit 102, input/output ports 104, read-only memory 106 (e.g., non-transitory memory), random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to a driver demand pedal 130 (e.g., a human/machine interface) for sensing force applied by human driver 132; a position sensor 154 coupled to brake pedal 150 (e.g., a human/machine interface) for sensing force applied by human driver 132, a measurement of engine manifold pressure (MAP) from pressure sensor 122 coupled to intake manifold 44; an engine position sensor from a Hall effect sensor 118 sensing crankshaft 40 position; a measurement of air mass entering the engine from sensor 120; and a measurement of throttle position from sensor 68. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined. Controller 12 may selectively activate and deactivate electric power consumers 170 and 171 (e.g., electric window defrosters, motors, actuators, resistive devices, etc.) to consume electric power supplied from electric energy storage device 91.

Controller 12 may also receive input from human/machine interface 11. A request to start the engine or vehicle may be generated via a human and input to the human/machine interface 11. The human/machine interface 11 may be a touch screen display, pushbutton, key switch or other known device. A remote server or other data processing device 133 may broadcast weather data including geographic areas that may be flooded to controller 12.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC).

During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion.

During the expansion stroke, the expanding gases push piston 36 back to BDC. Crankshaft 40 converts piston movement into a rotational power of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

FIG. 2 is a block diagram of a vehicle 225 including a powertrain or driveline 200. The powertrain of FIG. 2 includes engine 10 shown in FIG. 1. Powertrain 200 is shown including vehicle system controller 255, engine controller 12, electric machine controller 252, transmission controller 254, energy storage device controller 253, and brake controller 250. The controllers may communicate over controller area network (CAN) 299. Each of the controllers may provide information to other controllers such as power output limits (e.g., power output of the device or component being controlled not to be exceeded), power input limits (e.g., power input of the device or component being controlled not to be exceeded), power output of the device being controlled, sensor and actuator data, diagnostic information (e.g., information regarding a degraded transmission, information regarding a degraded engine, information regarding a degraded electric machine, information regarding degraded brakes). Further, the vehicle system controller 255 may provide commands to engine controller 12, electric machine controller 252, transmission controller 254, and brake controller 250 to achieve driver input requests and other requests that are based on vehicle operating conditions.

For example, in response to a driver releasing a driver demand pedal and vehicle speed, vehicle system controller 255 may request a desired wheel power or a wheel power level to provide a desired rate of vehicle deceleration. The requested desired wheel power may be provided by vehicle system controller 255 requesting a first braking power from electric machine controller 252 and a second braking power from engine controller 12, the first and second powers providing a desired driveline braking power at vehicle wheels 216. Vehicle system controller 255 may also request a friction braking power via brake controller 250. The braking powers may be referred to as negative powers since they slow driveline and wheel rotation. Positive power may maintain or increase a rate of driveline and wheel rotation.

In other examples, the partitioning of controlling powertrain devices may be partitioned differently than is shown in FIG. 2. For example, a single controller may take the place of vehicle system controller 255, engine controller 12, electric machine controller 252, transmission controller 254, and brake controller 250. Alternatively, the vehicle system controller 255 and the engine controller 12 may be a single unit while the electric machine controller 252, the transmission controller 254, and the brake controller 250 are stand-alone controllers.

In this example, powertrain 200 may be powered by engine 10 and electric machine 240. In other examples, engine 10 may be omitted. Engine 10 may be started with an engine starting system shown in FIG. 1, via BISG 219, or via driveline integrated starter/generator (ISG) 240 also known as an integrated starter/generator. A speed of BISG 219 may be determined via optional BISG speed sensor 203. Driveline ISG 240 (e.g., high voltage (operated with greater than 30 volts) electrical machine) may also be referred to as an electric machine, motor, and/or generator. Further, power of engine 10 may be adjusted via power actuator 204, such as a fuel injector, throttle, etc.

BISG 219 is mechanically coupled to engine 10 via belt 231. BISG may be coupled to crankshaft 40 or a camshaft (e.g., 51 or 53 of FIG. 1). BISG may operate as a motor when supplied with electrical power via electric energy storage device 275 or low voltage battery 280. BISG may operate as a generator supplying electrical power to electric energy storage device 275 or low voltage battery 280. Bi-directional DC/DC converter 281 may transfer electrical energy from a high voltage buss 274 to a low voltage buss 273 or vice-versa. Low voltage battery 280 is electrically coupled to low voltage buss 273. Electric energy storage device 275 is electrically coupled to high voltage buss 274. Low voltage battery 280 selectively supplies electrical energy to starter motor 96.

An engine output power may be transmitted to an input or first side of powertrain disconnect clutch 235 through dual mass flywheel 215. Disconnect clutch 236 may be electrically or hydraulically actuated. The downstream or second side 234 of disconnect clutch 236 is shown mechanically coupled to ISG input shaft 237.

Disconnect clutch 236 may be fully closed when engine 10 is supplying power to vehicle wheels 216. Disconnect clutch 236 may be fully open when engine 10 is stopped (e.g., not combusting fuel) or when engine 10 is supplying power to BISG 219 and BISG 219 is generating electrical charge to charge electric energy storage device 275 or supplying electrical charge to ISG 240.

ISG 240 may be operated to provide power to powertrain 200 or to convert powertrain power into electrical energy to be stored in electric energy storage device 275 in a regeneration mode. In addition, ISG 240 may rotate engine 10 from a position where the engine has stopped rotating to start or motor the engine. ISG 240 is in electrical communication with energy storage device 275. ISG 240 has a higher output power capacity than starter 96 shown in FIG. 1 or BISG 219. Further, ISG 240 directly drives powertrain 200 or is directly driven by powertrain 200. There are no belts, gears, or chains to couple ISG 240 to powertrain 200. Rather, ISG 240 rotates at the same rate as powertrain 200. Electrical energy storage device 275 (e.g., high voltage battery or power source) may be a battery, capacitor, or inductor. The downstream side of ISG 240 is mechanically coupled to the impeller 285 of torque converter 206 via shaft 241. The upstream side of the ISG 240 is mechanically coupled to the disconnect clutch 236. ISG 240 may provide a positive power or a negative power to powertrain 200 via operating as a motor or generator as instructed by electric machine controller 252. Electric machine controller 252 may command inverter 276, which converts direct current (DC) to alternating current (AC) or vice-versa, to provide operate ISG 240 as a motor or a generator. In addition, electric machine controller 252 may limit current flow to ISG 240 during engine cranking via commanding inverter 276.

Torque converter 206 includes a turbine 286 to output power to input shaft 270. Input shaft 270 mechanically couples torque converter 206 to automatic transmission 208. Torque converter 206 also includes a torque converter bypass lock-up clutch 212 (TCC). Power is directly transferred from impeller 285 to turbine 286 when TCC is locked. TCC is electrically operated by controller 12. Alternatively, TCC may be hydraulically locked. In one example, the torque converter may be referred to as a component of the transmission.

When torque converter lock-up clutch 212 is fully disengaged, torque converter 206 transmits engine power to automatic transmission 208 via fluid transfer between the torque converter turbine 286 and torque converter impeller 285, thereby enabling power multiplication. In contrast, when torque converter lock-up clutch 212 is fully engaged, the engine output power is directly transferred via the torque converter clutch to an input shaft 270 of transmission 208. Alternatively, the torque converter lock-up clutch 212 may be partially engaged, thereby enabling the amount of power directly relayed to the transmission to be adjusted. The transmission controller 254 may be configured to adjust the amount of power transmitted by torque converter 212 by adjusting the torque converter lock-up clutch in response to various engine operating conditions, or based on a driver-based engine operation request.

Torque converter 206 also includes pump 283 that pressurizes fluid to operate disconnect clutch 236, forward clutch 210, and gear clutches 211. Pump 283 is driven via impeller 285, which rotates at a same speed as ISG 240.

Automatic transmission 208 includes gear clutches (e.g., gears 1-10) 211 and forward clutch 210. Automatic transmission 208 is a fixed ratio transmission. Alternatively, transmission 208 may be a continuously variable transmission that has a capability of simulating a fixed gear ratio transmission and fixed gear ratios. The gear clutches 211 and the forward clutch 210 may be selectively engaged to change a ratio of an actual total number of turns of input shaft 270 to an actual total number of turns of wheels 216. Gear clutches 211 may be engaged or disengaged via adjusting fluid supplied to the clutches via shift control solenoid valves 209. Power output from the automatic transmission 208 may also be relayed to wheels 216 to propel the vehicle via output shaft 260. Specifically, automatic transmission 208 may transfer an input driving power at the input shaft 270 responsive to a vehicle traveling condition before transmitting an output driving power to the wheels 216. Transmission controller 254 selectively activates or engages TCC 212, gear clutches 211, and forward clutch 210. Transmission controller also selectively deactivates or disengages TCC 212, gear clutches 211, and forward clutch 210.

Further, a frictional force may be applied to wheels 216 by engaging friction wheel brakes 218. In one example, friction wheel brakes 218 may be engaged in response to a human driver pressing their foot on a brake pedal (not shown) and/or in response to instructions within brake controller 250. Further, brake controller 250 may apply brakes 218 in response to information and/or requests made by vehicle system controller 255. In the same way, a frictional force may be reduced to wheels 216 by disengaging wheel brakes 218 in response to the human driver releasing their foot from a brake pedal, brake controller instructions, and/or vehicle system controller instructions and/or information. For example, vehicle brakes may apply a frictional force to wheels 216 via controller 250 as part of an automated engine stopping procedure.

In response to a request to increase torque generated via vehicle 225, vehicle system controller may obtain a driver demand power or power request from a driver demand pedal or other device. Vehicle system controller 255 then allocates a fraction of the requested driver demand power to the engine and the remaining fraction to the ISG or BISG. Vehicle system controller 255 requests the engine power from engine controller 12 and the ISG power from electric machine controller 252. If the ISG power plus the engine power is less than a transmission input power limit (e.g., a threshold value not to be exceeded), the power is delivered to torque converter 206 which then relays at least a fraction of the requested power to transmission input shaft 270. Transmission controller 254 selectively locks torque converter clutch 212 and engages gears via gear clutches 211 in response to shift schedules and TCC lockup schedules that may be based on input shaft power and vehicle speed. In some conditions when it may be desired to charge electric energy storage device 275, a charging power (e.g., a negative ISG power) may be requested while a non-zero driver demand power is present. Vehicle system controller 255 may request increased engine power to overcome the charging power to meet the driver demand power.

In response to a request to decelerate vehicle 225 and provide regenerative braking, vehicle system controller may provide a negative desired wheel power (e.g., desired or requested powertrain wheel power) based on vehicle speed and brake pedal position. Vehicle system controller 255 then allocates a fraction of the negative desired wheel power to the ISG 240 and the engine 10. Vehicle system controller may also allocate a portion of the requested braking power to friction brakes 218 (e.g., desired friction brake wheel power). Further, vehicle system controller may notify transmission controller 254 that the vehicle is in regenerative braking mode so that transmission controller 254 shifts gears 211 based on a unique shifting schedule to increase regeneration efficiency. Engine 10 and ISG 240 may supply a negative power to transmission input shaft 270, but negative power provided by ISG 240 and engine 10 may be limited by transmission controller 254 which outputs a transmission input shaft negative power limit (e.g., not to be exceeded threshold value). Further, negative power of ISG 240 may be limited (e.g., constrained to less than a threshold negative threshold power) based on operating conditions of electric energy storage device 275, by vehicle system controller 255, or electric machine controller 252. Any portion of desired negative wheel power that may not be provided by ISG 240 because of transmission or ISG limits may be allocated to engine 10 and/or friction brakes 218 so that the desired wheel power is provided by a combination of negative power (e.g., power absorbed) via friction brakes 218, engine 10, and ISG 240.

Accordingly, power control of the various powertrain components may be supervised by vehicle system controller 255 with local power control for the engine 10, transmission 208, electric machine 240, and brakes 218 provided via engine controller 12, electric machine controller 252, transmission controller 254, and brake controller 250.

As one example, an engine power output may be controlled by adjusting a combination of spark timing, fuel pulse width, fuel pulse timing, and/or air charge, by controlling throttle opening and/or valve timing, valve lift and boost for turbo- or super-charged engines. In the case of a diesel engine, controller 12 may control the engine power output by controlling a combination of fuel pulse width, fuel pulse timing, and air charge. Engine braking power or negative engine power may be provided by rotating the engine with the engine generating power that is insufficient to rotate the engine. Thus, the engine may generate a braking power via operating at a low power while combusting fuel, with one or more cylinders deactivated (e.g., not combusting fuel), or with all cylinders deactivated and while rotating the engine. The amount of engine braking power may be adjusted via adjusting engine valve timing. Engine valve timing may be adjusted to increase or decrease engine compression work. Further, engine valve timing may be adjusted to increase or decrease engine expansion work. In all cases, engine control may be performed on a cylinder-by-cylinder basis to control the engine power output.

Electric machine controller 252 may control power output and electrical energy production from ISG 240 by adjusting current flowing to and from field and/or armature windings of ISG as is known in the art. ISG 240 may be applied to crank and start engine 10 during some conditions.

Transmission controller 254 receives transmission input shaft position via position sensor 271. Transmission controller 254 may convert transmission input shaft position into input shaft speed via differentiating a signal from position sensor 271 or counting a number of known angular distance pulses over a predetermined time interval. Transmission controller 254 may receive transmission output shaft torque from torque sensor 272. Alternatively, sensor 272 may be a position sensor or torque and position sensors. If sensor 272 is a position sensor, controller 254 may count shaft position pulses over a predetermined time interval to determine transmission output shaft velocity. Transmission controller 254 may also differentiate transmission output shaft velocity to determine transmission output shaft rate of speed change. Transmission controller 254, engine controller 12, and vehicle system controller 255, may also receive addition transmission information from sensors 277, which may include but are not limited to pump output line pressure sensors, transmission hydraulic pressure sensors (e.g., gear clutch fluid pressure sensors), ISG temperature sensors, and BISG temperatures, gear shift lever sensors, and ambient temperature sensors. Transmission controller 254 may also receive requested gear input from gear shift selector 290 (e.g., a human/machine interface device). Gear shift lever may include positions for gears 1-N (where N is an upper gear number), D (drive), and P (park).

Brake controller 250 receives wheel speed information via wheel speed sensor 221 and braking requests from vehicle system controller 255. Brake controller 250 may also receive brake pedal position information from brake pedal sensor 154 shown in FIG. 1 directly or over CAN 299. Brake controller 250 may provide braking responsive to a wheel power command from vehicle system controller 255. Brake controller 250 may also provide anti-lock and vehicle stability braking to improve vehicle braking and stability. As such, brake controller 250 may provide a wheel power limit (e.g., a threshold negative wheel power not to be exceeded) to the vehicle system controller 255 so that negative ISG power does not cause the wheel power limit to be exceeded. For example, if controller 250 issues a negative wheel power limit of 50 N-m, ISG power is adjusted to provide less than 50 N-m (e.g., 49 N-m) of negative power at the wheels, including accounting for transmission gearing. Engine 10 may be included in other hybrid vehicle configurations. Therefore, engine 10 may be cranked via one or more electric machines that are not show, but it should be appreciated that engine 10 may be rotated via other electric machines.

Thus, the system of FIGS. 1 and 2 provides for a system, comprising: an engine; an electric machine; an electric power source; and a controller including executable instructions stored in non-transitory memory that cause the controller to adjust an amount of electric current that is supplied from the electric power source to the electric machine in response to an indication that a vehicle is in a flooded area. The system includes where the vehicle includes the engine, and where the indication is provided via a sensor. The system further comprises additional instructions to rotate the engine via the electric machine. The system further comprises additional instructions to rotate the engine without supplying spark and fuel to the engine in response to the indication that the vehicle is in the flooded area. The system further comprises additional instructions to monitor an amount of electric power consumed via rotating the engine via the electric machine. The system further comprises additional instructions to cease rotating the engine in response to an indication of water ingestion by the engine. The system includes where the indication of water ingestion by the engine is based on the amount of electric power consumed via rotating the engine via the electric machine. The system includes where the adjusting includes reducing the amount of current.

Referring now to FIG. 3, shows a comparison of electric machine currents for cranking an engine versus time. Plot 300 includes a vertical axis that represents electric machine electric current during engine cranking (e.g., rotating the engine via torque generated by the electric machine). The horizontal axis represents time and time increases from the left side of plot 300 to the right side of plot 300. Solid line 302 represents electric current supplied to an electric machine that rotates an engine that does not ingest or water during engine cranking. Dashed line 304 represents electric current that is supplied to an electric machine that rotates an engine that does ingest water during engine cranking.

At time t0, the engine is not being cranked and electric current that is supplied to the electric machine that rotates the engine that does not ingest water is zero. Similarly, electric current that is supplied to the electric machine that rotates the engine that does ingest water during engine cranking is zero.

At time t1, electric current that is supplied to an electric machine that is cranking the engine that does not ingest water during engine cranking increases as engine cranking begins. Likewise, electric current that is supplied to the electric machine that is cranking the engine that does ingest water during engine craning increases as engine cranking begins. The electric current that is supplied to both electric machines is similar. The engines are rotated without supplying spark and fuel to the engines.

At time t2, the electric current that is supplied to the engine that ingests water increases to a higher level as the electric machine attempts to compress water in an engine cylinder (not shown). However, the water does not compress, but electric machine torque is at a high level as the electric machine attempts to rotate at a predetermined speed (e.g., 250 RPM). In this example, the electric machine current that is supplied to the engine that ingests water is limited so that components of the engine (e.g., rods, pistons, etc.) may not degrade. The electric current that is supplied to the engine that does not ingest water continues at its previous level since the torque to turn the engine is unchanged.

At time t3, electric current that is supplied to the engine that does not ingest water is reduced to zero to end the engine's cranking. The electric current that is supplied to the engine that ingested water continues at its previous level.

At time t4, the electric current that is supplied to the engine that does not ingest water and the engine that ingested water is reduced to zero.

Thus, it may be observed that an amount of electric current that is supplied to an electric machine may be indicative of whether or not an engine that the electric machine rotates has ingested water. If the engine has ingested water, electric current that is supplied to the electric machine may increase and the engine may stop rotating. If the engine has not ingested water, electric current that is supplied to the electric machine may continue at a previous level and the engine may continue rotating.

Figure 5:
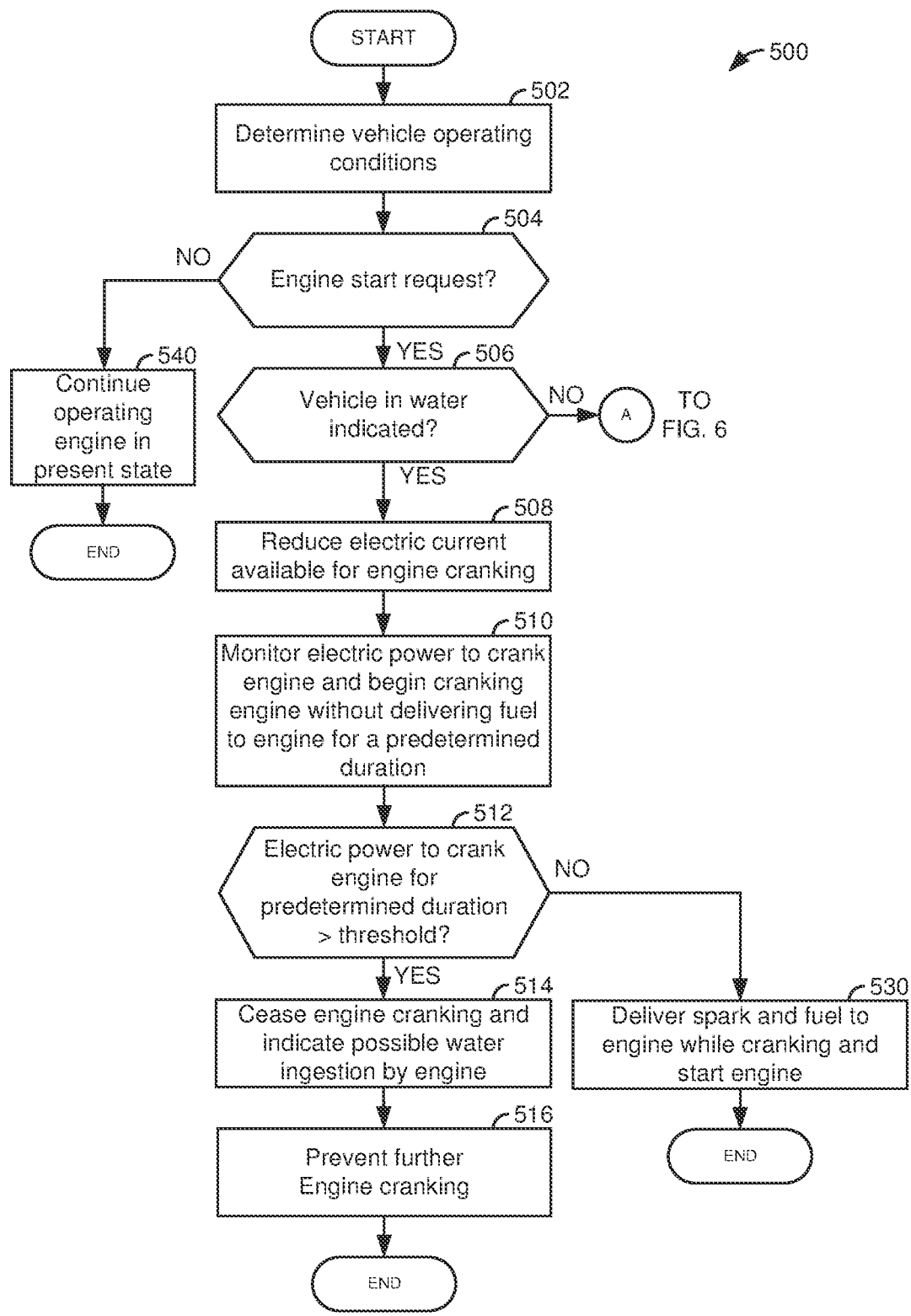
FIGS. 5 and 6 show a flowchart of a method for operating an engine.
Figure 6:
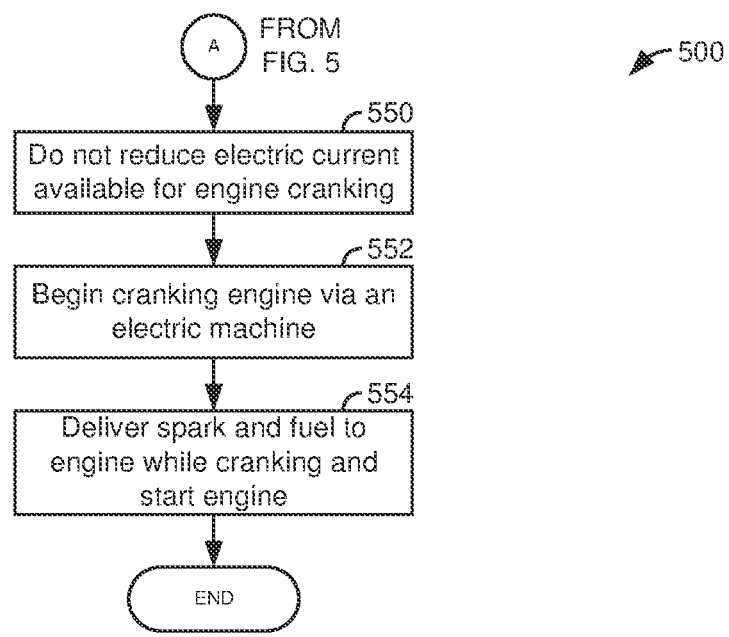
Figure 7A:
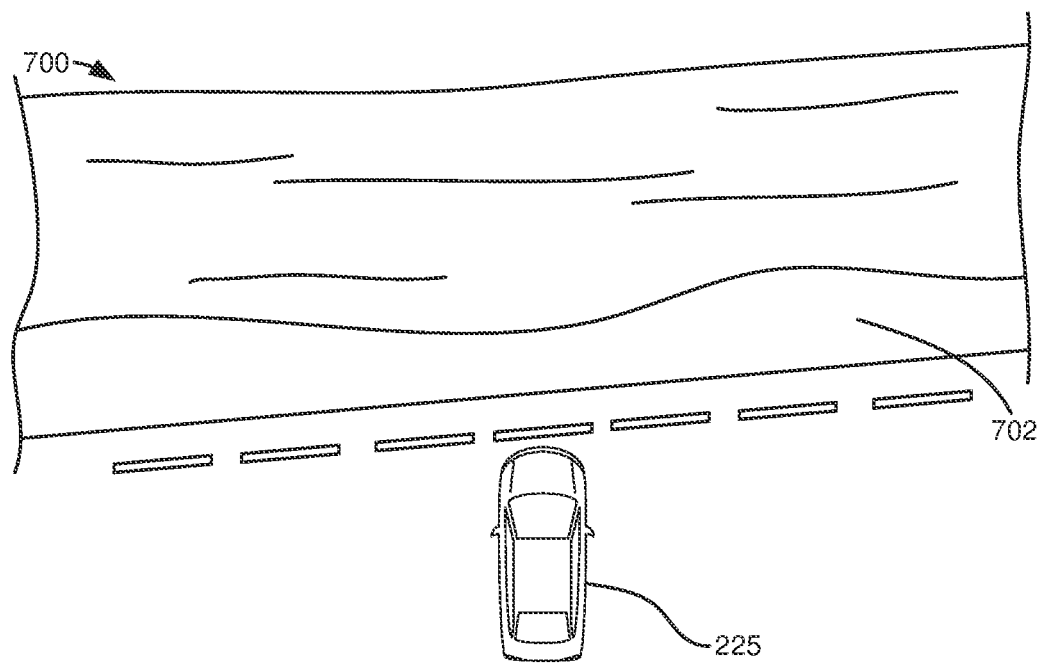
FIGS. 7A and 7B show geographical locations where a vehicle may be clear of water at times and exposed to water at other times.
Figure 7B:
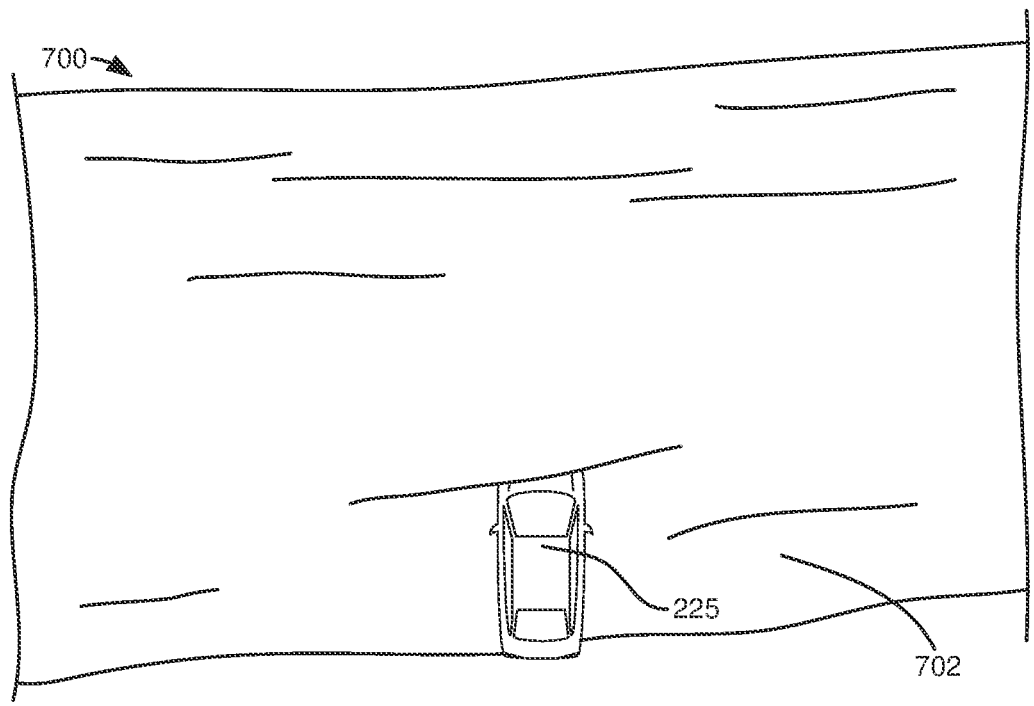

Referring now to FIG. 4, an example vehicle operating sequence according to the method of FIGS. 5 and 6 is shown. The operating sequence may be performed via the system of FIGS. 1 and 2 in cooperation with the method of FIGS. 5 and 6. Vertical lines at times t10-t16 represent times of interest during the sequence. The plots of FIG. 4 are time aligned. The double SS symbols along the horizontal axis represent a break in time and the break in time may be long or short in duration.

The first plot from the top of FIG. 4 is a plot of a water in engine state (e.g., water is in one or more engine cylinders) versus time. The vertical axis represents the water in engine state and there is water in the engine when trace 402 is at a higher level near the vertical axis arrow. There is not water in engine cylinders when trace 402 is at a lower level near the horizontal axis. The horizontal axis represents time and time increases from the left side of the figure to the right side of the figure. Trace 402 represents the water in engine state.

The second from the top of FIG. 4 is a plot of an engine start request state versus time. The vertical axis represents the engine start request state and an engine start is requested when trace 404 is at a higher level near the vertical axis arrow. There is not an engine start request when trace 404 is at a lower level near the horizontal axis. The horizontal axis represents time and time increases from the left side of the figure to the right side of the figure. Trace 404 represents the engine start request state.

The third from the top of FIG. 4 is a plot of a fuel injection state versus time. The vertical axis represents the fuel injection state and fuel is being injected to the engine when trace 406 is at a higher level near the vertical axis arrow. Fuel is not being injected to the engine when trace 406 is at a lower level near the horizontal axis. The horizontal axis represents time and time increases from the left side of the figure to the right side of the figure. Trace 406 represents the fuel injection state.

The fourth from the top of FIG. 4 is a plot of an engine spark state versus time. The vertical axis represents the engine spark state and spark is being delivered to the engine when trace 408 is at a higher level near the vertical axis arrow. Spark is not being delivered to the engine when trace 408 is at a lower level near the horizontal axis. The horizontal axis represents time and time increases from the left side of the figure to the right side of the figure. Trace 408 represents the engine spark state.

The fifth from the top of FIG. 4 is a plot of an engine starter state versus time. The vertical axis represents the engine starter state and the engine starter is engaged and rotating the engine when trace 410 is at a higher level near the vertical axis arrow. The engine starter is not rotating the engine when trace 410 is at a lower level near the horizontal axis. The horizontal axis represents time and time increases from the left side of the figure to the right side of the figure. Trace 410 represents the engine starter state.

The sixth plot from the top of FIG. 4 is a plot of engine cranking current (e.g., an amount of electric current used to crank the engine via the electric machine) versus time. The vertical axis represents the engine cranking current and the engine cranking current increases in the direction of the vertical axis arrow. The engine is not being cranked when trace 412 is at a lower level near the horizontal axis. The horizontal axis represents time and time increases from the left side of the figure to the right side of the figure. Trace 412 represents the engine cranking current.

At time t10, there is no water in the engine and an engine start is not being requested. The fuel injection is also off and spark is not being delivered to the engine. The engine starter is not engaged and engine cranking current is zero.

At time t11, there is no water in the engine and an engine start request is asserted. The fuel injection is activated and spark is delivered to the engine as the engine is rotated by the engine starter. The engine cranking current is at a lower level.

At time t12, the engine start request ceases in response to the engine starting (not shown). Fuel injection and spark delivery to the engine continues and water is not in the engine's cylinders. The engine starter is disengaged from the engine when the engine starts and the engine cranking current is reduced to zero.

Between time t12 and time t13, a break in the engine operating sequence occurs. The engine was running before the break, but the engine is stopped after the break. Water is not indicated in the engine before time t13.

At time t13, the water is indicated to be in the vicinity of the vehicle and the engine. The presence of water may be indicated by a remote server, sensor, or other means. The engine start request is not asserted and the engine starter is not engaged. The fuel injection and spark are not activated and the engine is not being cranked.

At time t14, the engine start request is asserted and the engine starter is engaged. The engine begins to be cranked and the engine cranking current is at a lower level. The electric current that is available to crank the engine (not shown) may be limited at this time in response to the indication of water. Fuel injection and spark are not activated so that the engine rotates without the possibility of combusting air and fuel. This may reduce a possibility of engine components degrading. The engine does not start because fuel and spark are not provided to the engine.

At time t15, the engine cranking current is increased in response to water being ingested into the engine. The engine does not start and engine rotation ceases (not shown). The engine cranking current is increased in an effort to maintain engine rotational speed, but the water cannot be compressed in the engine so the engine stops.

At time t16, the engine start request is withdrawn and the engine starter is disengaged. The engine cranking current is reduced to zero and water remains in the engine. However, the possibility of engine components degrading may be reduced since the engine cranking current is reduced.

In this way, a possibility of engine component degradation that is due to water in an engine may be reduced. If water is ingested into the engine, engine cranking torque may be reduced so that the water may be emptied at a later time from the engine without having to replace at least some engine components.

Referring now to FIGS. 5 and 6, a flow chart of a method for operating an engine with an exhaust tuning valve is shown. The method of FIGS. 5 and 6 may be incorporated into and may cooperate with the system of FIGS. 1 and 2. Further, at least portions of the method of FIGS. 5 and 6 may be incorporated as executable instructions stored in non-transitory memory while other portions of the method may be performed via a controller transforming operating states of devices and actuators in the physical world.

At 502, method 500 determines vehicle operating conditions. Vehicle operating conditions may include but are not limited to vehicle location, weather and flood data for the area around the vehicle, ambient temperature, engine speed, ambient humidity, vehicle speed, engine temperature, engine load, and driver demand torque or power. Method 500 may determine one or more vehicle operating conditions from data that is received to a controller. Method 500 proceeds to 504.

At 504, method 500 judges if there is an engine start request present. An engine start request may be generated via a pushbutton, key switch, key fob, phone, or other known device. If method 500 judges that an engine start request is present, the answer is yes and method 500 proceeds to 506. Otherwise, the answer is no and method 500 proceeds to 540.

At 540, method 500 continues to operate the engine in the engine's present operating state. For example, if the engine is stopped and not rotating, the engine remains stopped. If the engine is rotating and combusting fuel, the engine continues to combust fuel. Method 500 proceeds to exit.

At 506, method 500 judges if the vehicle is in an area that is flooded, or if water surrounding the vehicle is sufficiently deep to enter the engine or to be ingested by the engine. Method 500 may receive data from a remote server or weather transmitter that may indicate that the vehicle is in a flooded location. Alternatively, or in addition, a sensor may detect water that surrounds the vehicle or that is in close proximity to the engine. If method 500 determines that the vehicle may be in a flooded area, surrounded by water, or in a location where water may seep into or be ingested into the engine, the answer is yes and method 500 proceeds to 508. Otherwise, the answer is no and method 500 proceeds to 550.

At 550, method 500 does not take actions to reduce electric current that is available to start and crank the engine via an electric machine (e.g., a starter, ISG, etc.). Thus, the full torque capacity of the electric machine may be available to rotate the engine. Method 500 proceeds to 552.

At 552, method 500 begins cranking (e.g., rotating the engine at a speed for starting the engine) the engine via the electric machine. Method 500 proceeds to 554.

At 554, method 500 delivers spark and fuel to the engine while the engine is being rotated via the electric machine. The engine may start as fuel and spark are delivered to the engine. Method 500 proceeds to exit.

At 508, method 500 reduces an amount of electric current that is available to crank and rotate the engine via an electric machine. In one example, method 500 activates additional electric power consumers (e.g., windshield heaters, resistive elements, motors, etc.) to reduce an amount of electric current that is available for cranking an engine. Alternatively, or in addition, method 500 may command an inverter to reduce an amount of electric current that is available to crank the engine via an electric machine. Method 500 proceeds to 510.

At 510, method 500 monitors electric power that is supplied to crank the engine. In one example, method 500 may monitor the electric power via a current sensor and via monitoring battery voltage. Method 500 also cranks the engine via rotating the engine with an electric machine. The engine is rotated without supplying fuel and spark to the engine so that the engine will not start while water may be ingested to the engine. Ensuring that the engine does not start for a threshold amount of time while the engine is being cranked may prevent degradation of engine components. In addition, the amount of power that is consumed by the electric machine that cranks the engine (e.g., a starter, ISG, or other electric machine in the vehicle driveline) may be indicative of whether or not water may be inside the engine. In particular, if an amount of power to crank the engine exceeds a threshold amount of power, it may be inferred that water in the engine is preventing engine speed from achieving a desired level.

In one example, method 500 may measure an average electric current consumed by the electric machine to crank the engine for a predetermined amount of time (1 second) and store the result in a memory location or bin. The average electric current consumed may be stored in bins for a predetermined duration (e.g., 30 seconds). Battery voltage may be stored to memory at the same time. The amount of electric power consumed by the electric machine that cranks the engine may be determined by multiplying the amount of electric current stored in each bin multiplied by battery voltage when the electric current was consumed by the electric machine. The actual total amount of electric power consumed during engine cranking may be determined by summing the amount of electric power for each bin of electric current that was stored during the engine cranking period. Method 500 proceeds to 512.

At 512, method judges if the actual total amount of electric power consumed by the electric machine that cranked the engine during the engine cranking period is greater than a threshold amount of power. If so, the answer is yes and method 500 proceeds to 514. Otherwise, the answer is no and method 500 proceeds to 530. In one example, method 500 may compare the sum of electric power consumed by the electric machine that cranked the engine with a predetermined amount of power.

At 514, method 500 ceases cranking the engine via the electric machine and indicates that there may be water in the engine's cylinders. Method 500 may provide the indication via a human/machine interface. Method 500 proceeds to 516.

At 516, method 500 prevents further cranking of the engine while water may be in the engine. Method 500 may prevent electric current flow to the electric machine that cranks the engine. Method 500 proceeds to exit.

At 530, method 500 delivers spark and fuel to the engine while the engine is being cranked so that the engine may start. Method 500 proceeds to exit.

Thus, method 500 may control electric current flow to an electric machine to reduce a possibility of engine component degradation if an engine is in water or judged to be in a flooded area. If water is not detected within the engine by way of electric machine current, the engine may be started. If the engine is not in a flooded area or if water is not near the engine, the engine may be started in a usual manner via cranking the engine with spark and fuel being delivered to the engine.

Method 500 provides for a method for operating an engine, comprising: adjusting an amount of electric current available to crank the engine via a controller in response to an indication of flooding in a geographical area. The method includes where the indication of flooding is generated via a remote server. The method includes where the indication of flooding is generated via a sensor located in a vehicle that includes the engine. The method further comprises cranking the engine via an electric machine. The method includes where the electric machine is a starter motor. The method includes where the electric machine is configured to propel a vehicle. The method includes where the geographical area is an area surrounding a vehicle that includes the engine, and where the adjusting includes reducing the amount of electric current.

The method of FIGS. 5 and 6 also provides for a method for operating an engine, comprising: receiving an indication from a remote device to a controller that a vehicle may be located in a flooded geographical area; and adjusting an amount of electric current available to crank the engine via the controller in response to the indication. The method includes where the remote device is a server. The method includes where adjusting the amount of electric current available to crank the engine includes reducing the amount of electric current. The method further comprises monitoring an amount of electric current supplied to an electric machine to crank the engine. The method further comprises withholding spark and fuel delivery to the engine in response to the indication.

Referring now to FIG. 7A, a schematic showing a geographic area 700 around a vehicle 225 that includes an engine is shown. In this example, geographic area 700 includes a river 702 that is proximate to vehicle 225. The river is confined within its banks and vehicle 225 is not considered to be within a flooded geographical area. During such conditions, the vehicle's engine may be started by rotating the engine and supplying spark and fuel to the engine.

Referring now to FIG. 7B, a schematic showing a geographic area 700 around a vehicle 225 that includes an engine is shown. In this example, geographic area 700 includes a river 702 that has overflowed its banks and river water has partially surrounded vehicle 225. In FIG. 7B, vehicle 225 may be considered to be within a flooded geographical area. During such conditions, the vehicle's engine may be rotated via an electric machine without supplying spark and fuel to the engine so it may be determined if water has entered engine cylinders. If it is determined that water has not entered engine cylinders, the engine may be started.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, at least a portion of the described actions, operations and/or functions may graphically represent code to be programmed into non-transitory memory of the computer readable storage medium in the control system. The control actions may also transform the operating state of one or more sensors or actuators in the physical world when the described actions are carried out by executing the instructions in a system including the various engine hardware components in combination with one or more controllers.

This concludes the description. The reading of it by those skilled in the art would bring to mind many alterations and modifications without departing from the spirit and the scope of the description. For example, single cylinder, I3, I4, I5, V6, V8, V10, and V12 engines operating in natural gas, gasoline, diesel, or alternative fuel configurations could use the present description to advantage.

The invention claimed is:

1. A method for operating an engine, comprising:
reducing an amount of electric current available to crank the engine via a controller in response to an indication of flooding in a geographical area; and
cranking the engine with the reduced amount of electric current so that the engine is cranked using a cranking torque that is lowered due to the reduced amount of electric current, the lowered cranking torque for allowing the engine to stop rotating before an engine rod and/or piston is degraded due to water ingested into the engine.

2. The method of claim 1, where the indication of flooding is generated via a remote server.

3. The method of claim 1, where the indication of flooding is generated via a sensor located in a vehicle that includes the engine.

4. The method of claim 1, where the engine is cranked via an electric machine.

5. The method of claim 4, where the electric machine is a starter motor.

6. The method of claim 4, where the electric machine is configured to propel a vehicle.

7. The method of claim 1, where the geographical area is an area surrounding a vehicle that includes the engine.

8. The method of claim 1, wherein additional electric power consumers of a vehicle comprising the engine are activated to reduce the amount of electric current that is available for cranking the engine, the additional electric power consumers of the vehicle including windshield heaters, resistive elements, and/or motors.

9. A system, comprising:
an engine;
an electric machine;
an electric power source; and
a controller including executable instructions stored in non-transitory memory that cause the controller to:
reduce an amount of electric current that is supplied from the electric power source to the electric machine and rotate the engine via the reduced amount of electric current in response to an indication that a vehicle is in a flooded area so that the engine is rotated using a cranking torque that is lowered due to the reduced amount of electric current, the lowered cranking torque for allowing the engine to stop rotating before an engine rod and/or piston is degraded due to water ingested into the engine.

10. The system of claim 9, where the vehicle includes the engine, and where the indication is provided via a sensor.

11. The system of claim 9, where the engine is rotated via the electric machine.

12. The system of claim 11, where the engine is rotated without supplying spark and fuel to the engine in response to the indication that the vehicle is in the flooded area.

13. The system of claim 9, further comprising additional instructions to monitor an amount of electric power consumed via rotating the engine via the electric machine.

14. The system of claim 13, further comprising additional instructions to cease rotating the engine in response to an indication of water ingestion by the engine.

15. The system of claim 14, where the indication of water ingestion by the engine is based on the amount of electric power consumed via rotating the engine via the electric machine.

16. A method for operating an engine, comprising:
receiving an indication from a remote device to a controller that a vehicle may be located in a flooded geographical area; and
reducing an amount of electric current available to crank the engine via the controller in response to the indication and cranking the engine with the reduced amount of electric current so that the engine is cranked using a cranking torque that is lowered due to the reduced amount of electric current, the lowered cranking torque for allowing the engine to stop rotating before an engine rod and/or piston is degraded due to water ingested into the engine.

17. The method of claim 16, where the remote device is a server.

18. The method of claim 16, further comprising monitoring an amount of electric current supplied to an electric machine to crank the engine.

19. The method of claim 16, further comprising withholding spark and fuel delivery to the engine in response to the indication.

20. The method of claim 16, further comprising reducing an amount of electric current available to crank the engine by activating additional electrical power consumers of the vehicle, the additional electric power consumers of the vehicle including windshield heaters, resistive elements, and/or motors.

* * * * *